(12) United States Patent
Kim et al.

(10) Patent No.: US 6,650,510 B2
(45) Date of Patent: Nov. 18, 2003

(54) MAGNETIC HEAD WITH POLES OF INDUCTIVE HEAD ABOVE MR HEAD AND MAGNETIC SHIELD ABOVE INDUCTIVE HEAD

(75) Inventors: Yong-su Kim, Seoul (KR); No-yeol Park, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/994,804

(22) Filed: Nov. 28, 2001

(65) Prior Publication Data

US 2002/0064003 A1 May 30, 2002

(30) Foreign Application Priority Data

Nov. 28, 2000 (KR) .................... 2000-0071236

(51) Int. Cl.[7] .............. G11B 5/127; G11B 5/39
(52) U.S. Cl. ...................................... 360/319
(58) Field of Search ................ 360/319, 317, 360/313, 110, 125

(56) References Cited

U.S. PATENT DOCUMENTS

| | | | | |
|---|---|---|---|---|
| 4,672,493 A | * | 6/1987 | Schewe | 360/122 |
| 4,748,525 A | * | 5/1988 | Perlov | 360/110 |
| 5,075,956 A | * | 12/1991 | Das | 29/603.14 |
| 5,198,948 A | * | 3/1993 | Stover et al. | 360/124 |
| 5,402,295 A | * | 3/1995 | Suzuki et al. | 360/126 |
| 5,668,689 A | * | 9/1997 | Schultz et al. | 360/317 |
| 5,691,867 A | * | 11/1997 | Onuma et al. | 360/126 |
| 5,822,153 A | * | 10/1998 | Lairson et al. | 360/234.7 |
| 6,072,669 A | * | 6/2000 | Indeck | 360/121 |
| 6,339,523 B1 | * | 1/2002 | Santini | 360/126 |
| 6,407,891 B1 | * | 6/2002 | Chang et al. | 360/317 |

FOREIGN PATENT DOCUMENTS

JP          2-61812       * 3/1990

* cited by examiner

*Primary Examiner*—Julie Anne Watko
(74) *Attorney, Agent, or Firm*—Burns, Doane, Swecker & Mathis, LLP

(57) ABSTRACT

Provided is a magnetic head including a bottom pole, a top pole spaced a predetermined distance apart from the bottom pole, an inductive write coil for forming a magnetic field at the bottom and top poles, and a magnetic shield layer positioned over the top pole.

8 Claims, 5 Drawing Sheets

MAGNETIC HEAD WITH POLES OF INDUCTIVE HEAD ABOVE MR HEAD AND MAGNETIC SHIELD ABOVE INDUCTIVE HEAD

Priority is claimed to Patent Application Number 2000-71236, filed in the Republic of Korea on Nov. 28, 2000, herein incorporated by reference.

BACKGROUND OF THE INVENTION

1. Field of the Invention

The present invention relates to a magnetic head for writing/reading a magnetic signal on/from a recording medium, and more particularly, to a magnetic head constructed so as not to generate magnetic concentration due to external magnetic field.

2. Description of the Related Art

An apparatus for writing/reading a magnetic signal on/from a recording medium, e.g., a hard disk drive, includes a magnetic head for writing and reading information. A magnetic head 10, as shown in FIG. 1, is installed in a slider 20 provided at one end of a swing arm 30, and moves to a track being at a desired position on a recording medium (not shown) by rotation of the swing arm 30 to perform a write or read operation.

FIG. 2 is an enlarged view of the magnetic head 10 shown in FIG. 1 As shown in FIG. 2, the magnetic head 10 includes a magneto-resistive head 14 for reading information and an inductive write head for writing information. The magneto-resistive head 14 reads a magnetic signal written on a recording medium, and the inductive write head including a top pole 11 and a bottom pole 12 for producing a leakage flux passing through the recording layer of the recording medium, and a write coil 13 used as a current supply route, writes given information on a recording medium.

The inductive write head affects the quality of a signal written on a recording medium. That is, if inputting by the inductive write head is not clearly performed, reproduction cannot be satisfactorily performed even if the performance of the magneto-resistive head 14 is excellent. In particular, the inductive write head is very sensitive to an external magnetic field. For example, if a magnetic stray field generated from a voice coil motor (VCM) for driving the swing arm is concentrated by the inductive write head. This is called an antenna effect, in which information is erroneously written on or erased from a recording medium by the external magnetic field concentrating in the inductive write head.

FIGS. 3A and 3B show the distribution of a magnetic flux induced to an inductive write head and a recording medium by an antenna effect arising due to an external magnetic field.

As shown in FIGS. 3A and 3B, a magnetic field generated from an external magnetic field generating source 1 by an antenna effect extends toward top and bottom poles 11 and 12 of an inductive write head. A soft magnetic layer 3 is formed under a recording layer 2 of a recording medium. In this case, magnetic concentration occurs at the top and bottom poles 11 and 12 of the inductive write head. In particular, as shown in FIG. 3B, in view of configuration of the top pole 11, a width w' of a portion positioned over the write coil 13 is much greater than a width w of a portion facing the recording layer 2. For example, in the case where the magnetic strength of a rear part of the top pole 11 is 100 Oe (oersted), the magnetic strength of an edge part corresponding to the recording layer 2 is 100×w'/w Oe. In other words, the magnetism at the edge part is strengthened in a proportion of w'/w. As described above, the external magnetic field concentrated by the top and bottom poles 11 and 12 affects the recording layer 2 by being strengthened at the edge part. In a vertical writing type magnetic head, erasure is first performed by a bottom pole and a write operation is then performed by a top pole. The external magnetic field is a stray field that undesirably causes erasure of information and a write operation of information. Major factors of the external magnetic field generating source 1 include a swing arm, which is a magnetic field generating source in an information recording apparatus and provides a magnetic circuit, and a VCM for driving the swing arm. The magnetic concentration due to the external magnetic field is disadvantageous for a high-density information recording system.

SUMMARY OF THE INVENTION

To solve the above-described problems, it is an object of the present invention to provide a magnetic head which can effectively suppress a magnetic concentration due to an external magnetic field.

It is another object of the present invention to provide a magnetic head which can effectively write and erase erroneous information by suppressing concentration of an external magnetic field.

To accomplish the above objects, there is provided a magnetic head including a bottom pole, a top pole spaced a predetermined distance apart from the bottom pole, an inductive write coil for forming a magnetic field at the bottom and top poles, and a magnetic shield layer which is positioned over the top pole and whose the leading edge is aligned with the leading edge of the top pole.

According to an embodiment of the present invention, the width of the magnetic shield layer is wider than the width of the top pole. Also, an intermediate layer is preferably interposed between the edges of the magnetic shield layer and of the top pole opposite to the edge intended to be adjacent to the recording media, and the intermediate layer is preferably made of a magnetic material. Further, a magneto-resistive head is positioned under the bottom pole.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
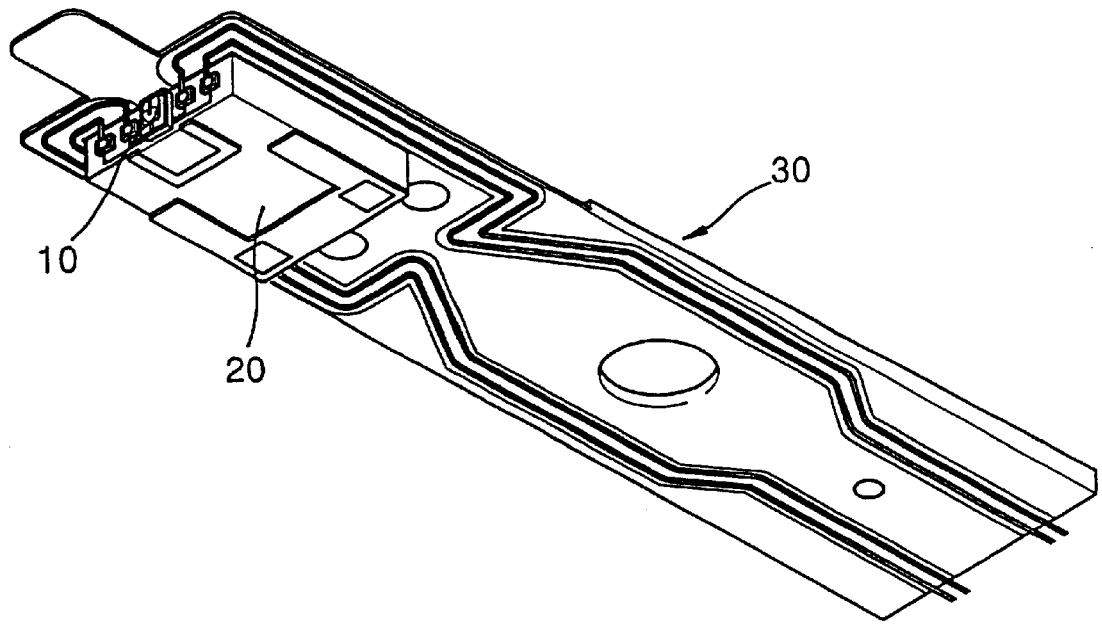
FIG. 1 is an extracted perspective view of a swing arm of an information recording apparatus, in which a general magnetic head is installed.
Figure 2:
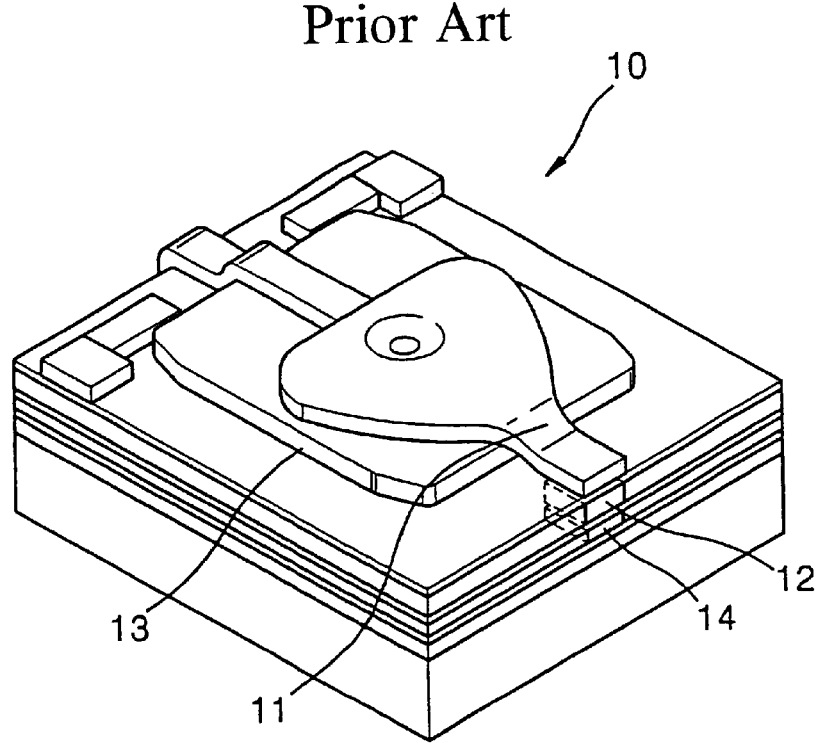
FIG. 2 is a schematic perspective view of a conventional magnetic head.
Figure 3A:
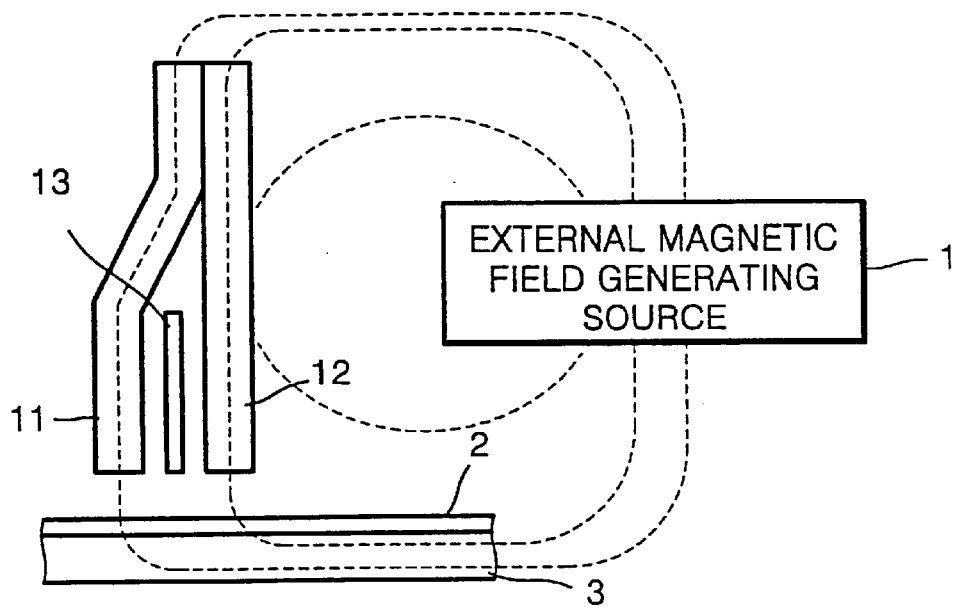
FIGS. 3A and 3B show the distribution of a magnetic field generated by the conventional magnetic head shown in FIG. 2, showing magnetic concentration due to an external magnetic field.
Figure 3B:
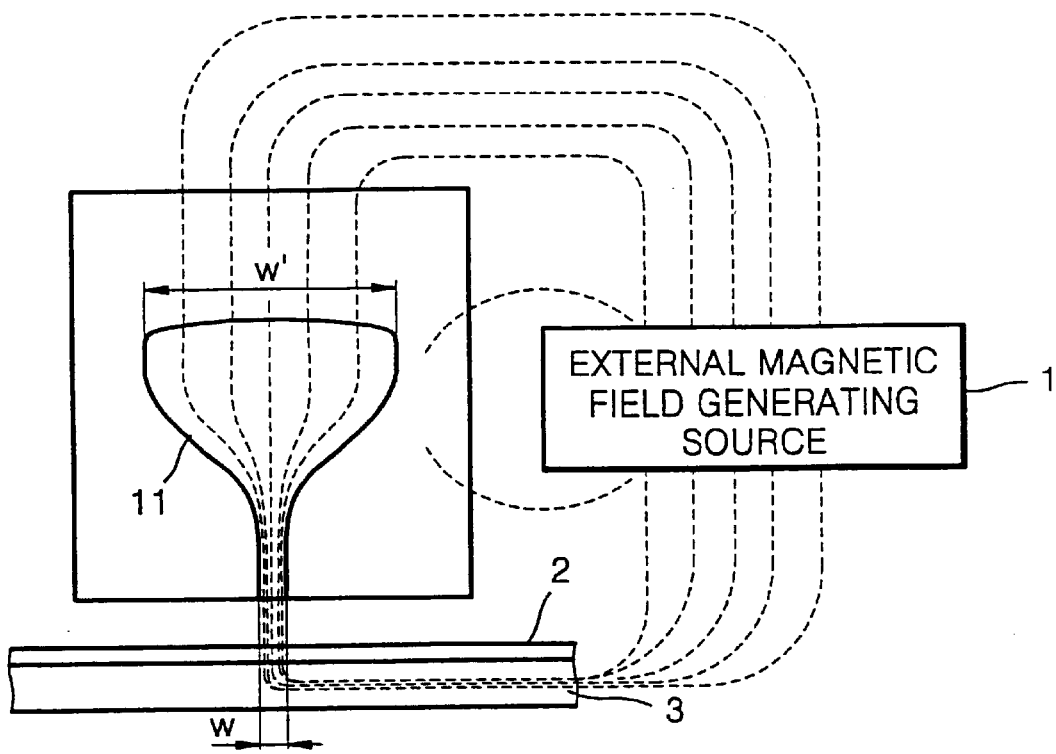
Figure 4:
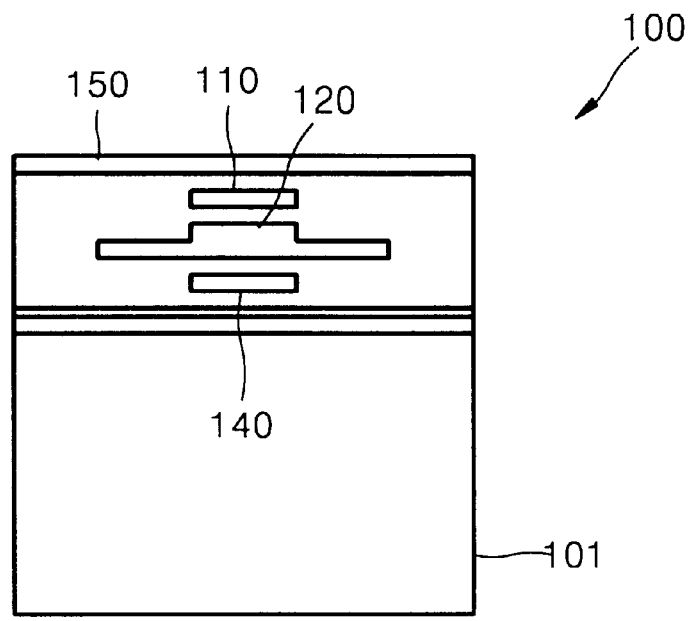
FIG. 4 is a schematic front view of a magnetic head according to the present invention.

Referring to FIG. 4, a multi-layer stack structure for writing and reading information is formed on a substrate 101. A magnetic shield layer 150, which features the present invention, is formed on the topmost layer of the multi-layer stack structure. A top pole 110 is formed under and spaced a predetermined distance apart from the magnetic shield layer 150, and a bottom pole 120 is formed under the top pole 110. A magneto-resistive head 140 is positioned under the bottom pole 120. The magnetic shield layer 150 is formed of a metal, preferably a magnetic material, and has a width greater than that of the top pole 110 or the bottom pole 120.

Here, the widths of upper and lower parts of the magnetic shield layer 150 are preferably equal to each other. In the case where the widths of upper and lower parts of the magnetic shield layer 150 are different, they must be adjusted such that the magnetic strength concentrated in the edge part is less than that required for erasure or a write operation performed on a recording layer. A lower-part structure, excluding the magnetic shield layer 150 from the aforementioned multi-layer stack structure, is the same as the structure of the conventional magnetic head. All parts of a magnetic head are not shown and described in the drawing.

Figure 5A:
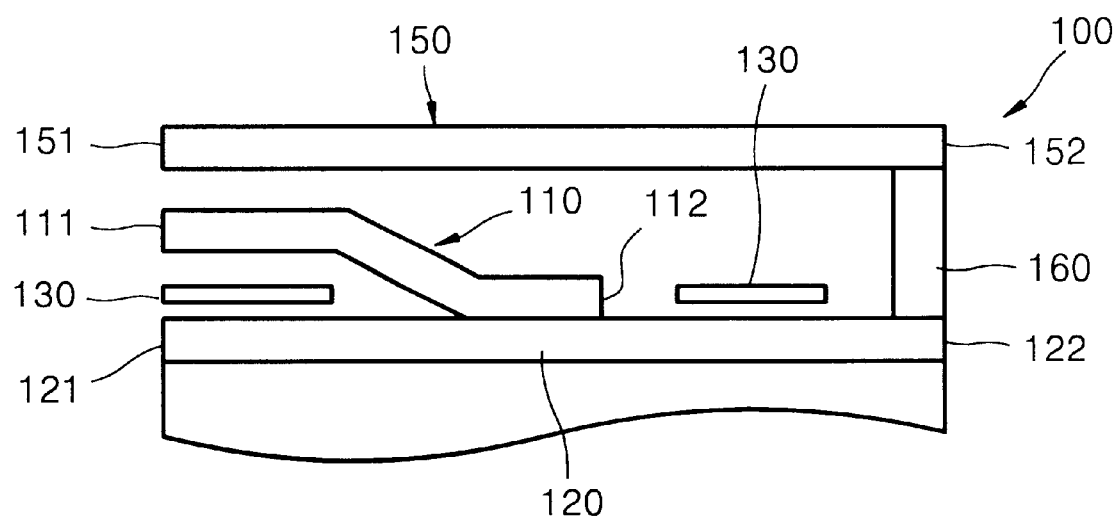
FIG. 5A is an extracted side view of the magnetic head shown in FIG. 4.
Figure 5B:
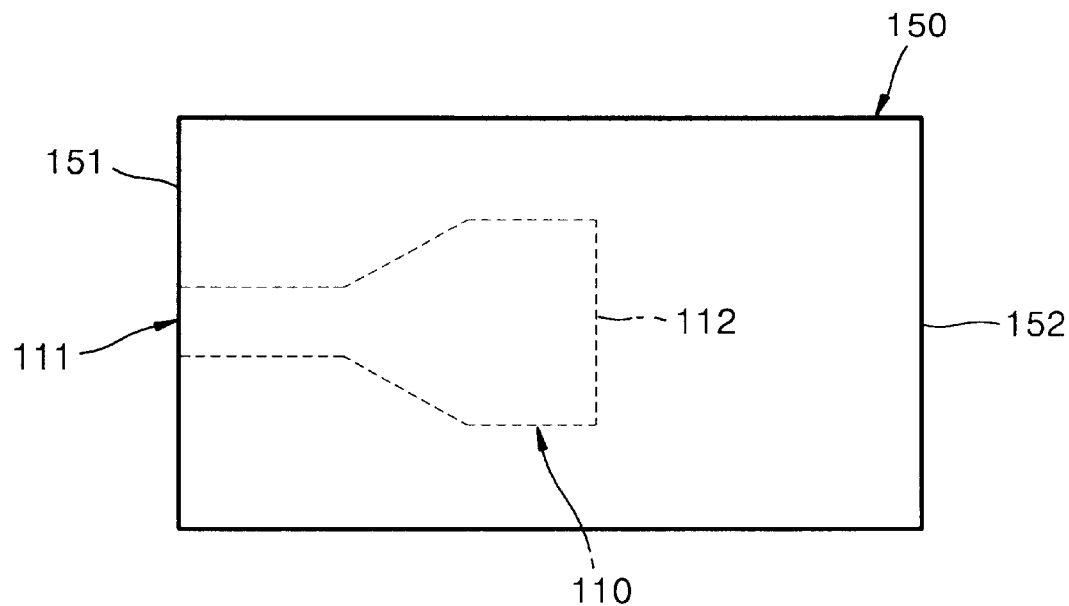
FIG. 5B is a plan view of the magnetic head shown in FIG. 4.

Referring to FIG. 5A, in a magnetic head 100, a top pole 110 is formed on a bottom pole 120. An inductive write coil 130 for writing information is positioned between the bottom pole 120 and the top pole 110. The bottom pole 120 and the top pole 110 are spaced a predetermined distance apart from a recording layer of a recording medium. A magnetic shield layer 150 is formed above and spaced a predetermined distance apart from the top pole 110. An edge 151 of the magnetic shield layer 150 is aligned with edges 111 and 121 of the bottom and top poles 120 and 110 adjacent to the recording media. An opposite edge 122 of the bottom pole 120 and an opposite edge 152 of the top pole 110 (opposite to the edges 111 and 121 adjacent to the recording media) extend by the same length. An intermediate layer 160 is interposed between these edges 122 and 152.

Figure 5C:
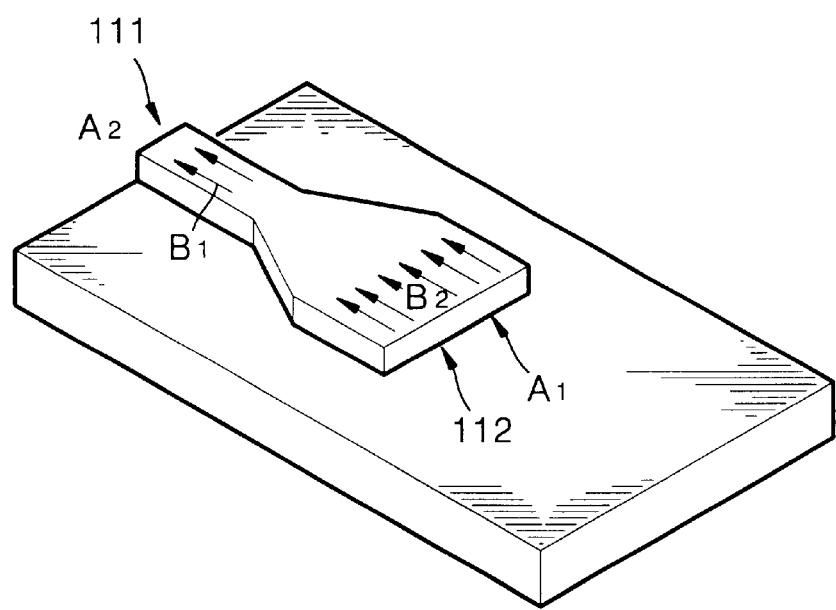
FIG. 5C is an extracted perspective view of the magnetic head shown in FIG. 4.

FIG. 5C is an extracted view of the top pole 110, showing the state in which a magnetic flux is formed. Assuming that a cross-sectional area of the edge intended to be adjacent to a recording media 111 of the top pole 110 is $A_2$, and a cross-sectional area of the edge 112 intended to be opposite to the edge adjacent to the recording media is $A_1$, $A_1 \times B_1 = A_2 \times B_2$, where $B_1$ denotes a magnetic flux density at the edge 112 intended to be opposite to the edge adjacent to the recording media of the top pole 110 and $B_2$ denotes a magnetic flux density at the edge 111 intended to be adjacent to a recording media of the top pole 110. In other words, the number of magnetic fluxes passing through the top pole 110 equals at both edges 111 and 112. Thus, the magnetic flux density $B_2$ at the edge 111 intended to be adjacent to a recording media of the top pole 110 is inversely proportional to the cross-sectional area $A_2$ thereat, as $B_2 = (A_1/A_2) \cdot B_1$. According to experimentation, in order to obtain a magnetic flux density in which information can be more effectively written, the cross-sectional area $A_2$ at the edge 111 intended to be adjacent to a recording media of the top pole 110 is greater than or equal to a fifth (⅕) the cross-sectional area $A_1$ at the edge 112 intended to be opposite to the edge adjacent to the recording media of the top pole 110, preferably ⅓.

The above-described magnetic head positioned at an edge of a swing arm of an information recording apparatus is fixed to a front face of a slider flying over the recording plane of a recording medium by an aerial negative pressure. The intermediate layer 160 may be formed of a non-magnetic material. However, in order to suppress magnetic concentration due to an external magnetic field, a magnetic material is more preferably used as the intermediate layer 160. The magnetic head having a multi-layer stack structure optionally includes the intermediate layer 160, and the intermediate layer 160 may not be formed. However, the magnetic head essentially includes a recording layer where a write operation actually occurs, and a soft magnetic layer provided under the recording layer.

Figure 6A:
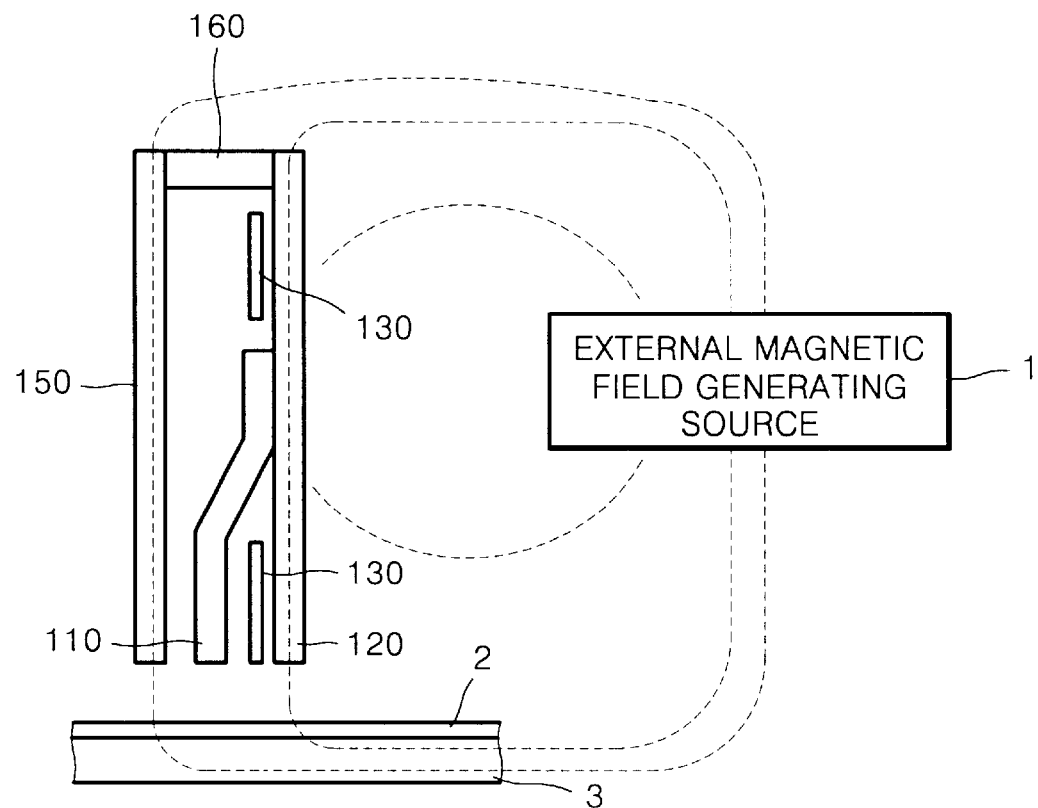
FIGS. 6A and 6B show the distribution of a magnetic field generated by the magnetic head according to the present invention, showing the distribution of a magnetic field due to an external magnetic field.
Figure 6B:
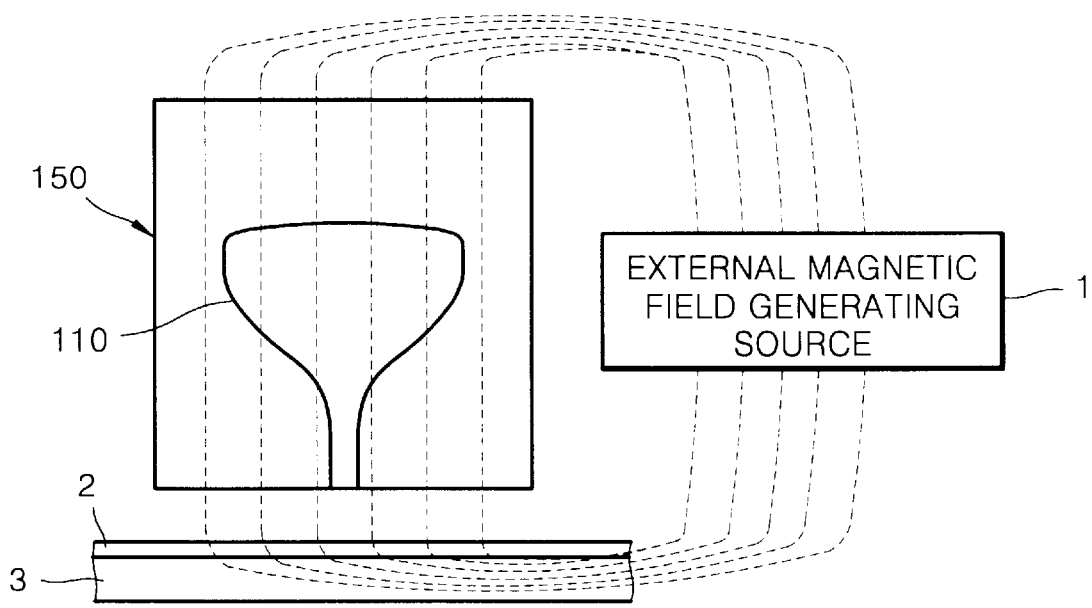

FIGS. 6A and 6B show a magnetic circuit provided when an external magnetic field is produced at the magnetic head having the aforementioned configuration.

As shown in FIGS. 6A and 6B, a magnetic field generated from the external magnetic field generating source 1 by an antenna effect extends toward the top and bottom poles 110 and 120. Here, a magnetic circuit is produced by the magnetic shield layer 150 formed over the top pole 110. In other words, in the case where the intermediate layer 160 provided between the magnetic shield layer 150 and the edge intended to be opposite to the edge adjacent to the recording media of the bottom pole 120 is formed of a magnetic material, a magnetic field is produced from the external magnetic field generating source 1 with respect to the intermediate layer 160. In this case, the intermediate layer 160 provides a magnetic circuit, which branches off the magnetic field into the magnetic shield layer 150 and the bottom pole 120 without concentrating the induced magnetic field.

Thus, the magnetic field generated from the external magnetic field generating source 1 is distributed to the magnetic shield layer 150, the top pole 110 and the bottom pole 120, thereby suppressing magnetic concentration at the recording layer 2. Here, the strength of the magnetic field passing through the top pole 110 position between the bottom pole 120 and the magnetic shield layer 150 is weaker than that of the magnetic field passing between the bottom pole 120 and the magnetic shield layer 150. The weakened magnetic field concentration makes a magnetic field smaller than is required for writing or erasing information, thereby preventing information from erroneously being written or erased due to an external magnetic field. In particular, the width of the magnetic shield layer 150 is wider than that of the top pole 110 or the top pole 120, so that an external magnetic field can be shielded or absorbed to then be distributed to the entire area of the magnetic shield layer 150.

As described above, the external magnetic field is mainly generated from a swing arm, which is a magnetic field generating source in an information recording apparatus and provides a magnetic circuit, and a VCM for driving the swing arm. However, the magnetic shield layer 150 according to the present invention suppresses magnetic concentration with respect to the top and bottom poles 110 and 120 provided under the magnetic shield layer 150 due to the external magnetic field.

The magnetic head according to the present invention is constructed to effectively distribute and shield an external magnetic field, thereby reducing an antenna effect and exhibiting excellent recording characteristics.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A magnetic head comprising:

a magneto-resistive head;

a bottom pole spaced a predetermined distance from the magneto-resistive head;

a top pole spaced a predetermined distance apart from the bottom pole on a side opposite to the magneto-resistive head;

an inductive write coil for forming a magnetic field at the bottom and top poles; and a magnetic shield layer positioned over the top pole on a side of the top pole opposite to the side adjacent to the bottom pole, wherein the width of the magnetic shield layer is wider in width than a width of the top pole.

2. The magnetic head of claim 1, wherein an edge of the magnetic shield layer intended to be adjacent to a magnetic recording media is aligned with an edge of the top pole intended to be adjacent to a magnetic recording media.

3. The magnetic head of claim 2, further comprising an intermediate layer interposed between edges of the magnetic shield layer and the bottom pole opposite to the edges of the magnetic shield layer and the bottom pole intended to be adjacent to a recording media.

4. The magnetic head of claim 3, wherein the intermediate layer is made of a magnetic material.

5. The magnetic head of claim 1, further comprising an intermediate layer interposed between edges of the magnetic shield layer and the bottom pole opposite to the edges of the magnetic shield layer and the bottom pole intended to be adjacent to a recording media.

6. The magnetic head of claim 5, wherein the intermediate layer is made of a magnetic material.

7. The magnetic head of claim 1, wherein the magnetic shield layer is made of a magnetic material.

8. The magnetic head of claim 1, wherein the cross-sectional area of an edge of the top pole intended to be adjacent to a recording media is less than a fifth ($\frac{1}{5}$) that of an opposite edge of the top pole.

* * * * *